United States Patent [19]

Hort

[11] 3,920,759

[45] Nov. 18, 1975

[54] ETHYNYLATION CATALYST AND METHOD OF PRODUCING ALKYNOLS BY LOW PRESSURE REACTIONS

[75] Inventor: Eugene V. Hort, Piscataway, N.J.

[73] Assignee: GAF Corporation, New York, N.Y.

[22] Filed: Apr. 24, 1972

[21] Appl. No.: 246,607

[52] U.S. Cl............ 260/635 Y; 252/456; 260/638 Y
[51] Int. Cl.² .................... C07C 29/00; C07C 33/04
[58] Field of Search ................................ 260/635 Y

[56] References Cited
UNITED STATES PATENTS 2,871,273  1/1959  Behn .............................. 260/635 Y
3,560,576  2/1971  Kirchner ........................ 260/635 Y

OTHER PUBLICATIONS

Reppe et al., "Alien Property Custodian," 1943, Ser. No. 327,820.

Primary Examiner—Joseph E. Evans
Attorney, Agent, or Firm—Walter C. Kehm; James N. Blauvelt

[57] ABSTRACT

An ethynylation catalyst derived from a particulate water-insoluble powder containing copper and magnesium silicate and process for producing alkynols therewith.

8 Claims, No Drawings

3,920,759

ETHYNYLATION CATALYST AND METHOD OF PRODUCING ALKYNOLS BY LOW PRESSURE REACTIONS

BACKGROUND OF THE INVENTION

This invention relates to the production of alkynols by a low pressure ethynylation reaction, i.e., the introduction of acetylene into a reaction mixture of an aldehyde across the double bond thereof to yield a product containing a triple bond.

Alkynols are generally prepared in accordance with the well known processes for their production, such as those described in U.S. Pat. Nos. 2,232,867; 2,300,969; 2,487-06-9; 2,712,560; 2,768,215; 3,108,140; 3,294,849; and 3,560,576, viz., by reacting aldehydes or ketones with an acetylenic hydrocarbon of the general formula R—C ≡ CH, wherein R represents hydrogen or the radical of a hydrocarbon, such as methyl, vinyl, or phenyl. The acetylene or acetylenic hydrocarbon is introduced into the reaction as a gas, while the aldehyde or ketyone may be a liquid under reaction conditions, or may be present in a liquid solvent or diluent.

It is known that the reaction proceeds at moderately elevated temperatures of from 50° to 150°C. at superatomospheric pressures. Pressures of from 2 to 30 atmospheres are those generally suggested. Experience, however, has shown that a suitable pressure for compressed gaseous acetylene is in the range of less than 10 atmospheres and with careful control of the temperature. Even at these pressures the acetylene gas has been diluted with inert gases or varpors e.g., nitrogen, hydrogen or carbon dioxide in order to reduce the danger of violent decomposition. These high pressure reactions, however, still have their inherent safety limitations.

The above mentioned ethynylation reactions generally employ some form of cuprous acetylide catalyst, which catalyst may be generated or made active from a variety of copper compounds. These ethynylation reactions have been carried out with the catalyst either supported or unsupported.

These cuprous acetylide catalysts have heretofore been prepared in various ways and thereafter used to catalyze the ethynylation reaction; typically the reaction involving formaldehyde and acetylene in the presence of the cuprous acetylide catalyst to yield butynediol.

These prior art catalysts per se have often been readily explosive, difficult to filter, and overly active in the unwanted catalysis of cuprene formation. They are often used together with a bismuth compound in high pressure systems to minimize said cuprene formation. Supported catalysts also have been used in said high pressure systems, such as those impregnated with a solution of bismuth and copper nitrates, dried, and calcined to produce the metal oxide; and the copper oxide thereafter converted to an acetylide in situ in the ethynylation reaction. These reactions, however, have suffered from the main drawback in that butynediol is not generated at a sufficiently rapid rate and the yield thereof per gram of catalyst has been relatively low.

In order to achieve low ethynylation operating costs, i.e., favorable economic conditions to justify the reaction it has generally been preferred to use the supported catalyst in pellet form in a fixed bed plug flow process, feeding dilute aqueous formaldehyde and employinog multi-point injection of acetylene at relatively high pressure, so as to use up excess formaldehyde and minimize the extent that distillation is required to produce a product of requisiste purity. An undesirable feature of this approach, however, has been the high initial cost of reactors designed to withstand not only the normal acetylene operating pressures of up to 26 atmospheres, but also the higher pressures of up to 20 times greater than normal which occur coincidentally with the occasional acetylene decomposition which occurs at high pressures.

It has also been proposed to employ such supported catalysts as slurries in continuous stirred reactions. Hitherto in such systems, however, not only has it been found necessary to remove and purify the catalyst at frequent intervals to avoid fouling, but also even with continuous complete catalyst purification and recycle, it has been necessary to operate at relatively low formaldehyde conversions and relatively high acetylene pressures to achieve even marginally acceptable space/time yields. It has not heretofore been possible to simultaneously generate the supported catalyst and produce the butynediol in an economical low pressure system (52 Chem. Abstract 252, 1693 and 44 Khim. Prom. No. 12, 885–87, 1968). Where such low pressure systems have been employed, the yield and purity of product have not been sufficient to warrant commercial use of such a system. Such processes have, heretofore, involved higher operating costs than fixed bed plug flow processes, because of the higher product separation expense, and offered little in the way of savings because of the relatively poor rate of reaction and inferior catalyst life.

In general, it has been found, that active acetylide catalysts prepared from cuprous compounds, or from cupric compounds in such a way that a substantial portion of the cupric compound is reduced to cuprous copper before formation of the acetylide, tend to have a low carbon to copper ratio in which condition they have been described as being in the form of small, sticky, relatively explosive particles, commonly containing appreciable amounts of metallic copper. Furthermore, it has been claimed in the literature that generated cuprous acetylide catalysts prepared from cupric compounds under an acetylene partial pressure of greater than 2 atmospheres or in the absence of formaldehyde, or in the presence of radically unbalanced amounts of acetylene or formaldehyde, or from cupric compounds which are highly soluble or dispersed in media where the copper tends to dissolve, tend to have an insufficient total surface area and are accordingly not very effective, viz-a-viz, production of the alkynol. The instant invention has clearly disproven these theories.

A catalyst based upon copper carbonate or certain other insoluble copper compounds has been described (U.S. Pat. No. 3,560,576) as one which obviates the aforedescribed difficulties. It has been shown, however, that such a catalyst is very sensitive and permanently loses activity upon being starved for either formaldehyde or acetylene and as pointed out therein, can easily be detonated by heating same to 162°C. In clear contradistinction thereto, the instant catalyst is not permanently damaged by said starvation and moreover, cannot be detonated under any circumstances.

SUMMARY OF THE INVENTION

It is an object of the present invention to provide a low pressure ethynylation catalyst precursor and an active catalyst derived therefrom.

It is another object of the present invention to provide for a process for the preparation of acetylenic diols employing the above mentioned active catalyst.

It is a further object to avoid one or more drawbacks of the prior art.

These and other objects will become more apparent from the description as proceeds hereinafter.

Broadly speaking, the ethynylation catalyst is comprised of a particulate water insoluble powder containing copper and magnesium silicate.

There is further provided a process which comprises subjecting the catalyst precursor in an aqueous medium at a temperature of about 70° to about 120°C, preferably to the simultaneous action of formaldehyde and acetylene at a partial pressure of less than 2 atmospheres thereby generating the active catalyst.

There is further provided a method of carrying out the ethynylation process batch wise or on a continuous scale, the latter comprises preferably simultaneously and continuously contacting the carbonyl compound and acetylene at said pressure with the above described catalyst as a slurry in an aqueous medium to a continuous stirred reaction at said temperature. Both the generation of catalyst and synthesis of alkynol may go forward continuously and simultaneously. As an alternative, however, one may first generate the catalyst in a seperate reaction zone and then place same in the ethynylation reaction zone whereafter the latter reaction can then be carried out. As a further alternative to either of the aforesaid processes, the generated catalyst can be employed (either manner of generation having been followed) until the activity thereof drops below a desired point; at which time the catalyst may then be replaced with fresh catalyst either by completely removing the former or by withdrawing portions thereof while at the same time adding fresh catalyst to the reaction medium.

In any case, the simultaneous procedure referred to above operates along the following lines:

The reduction of the cupric compound and the subsequent production of alkynol therewith may be carried out in the same reactor, thereby forcing both the generation of catalyst and alkynol product to be continuous and simultaneous at all times.

The synthesis is carried out with the catalyst, impregnated in an inert powdered carrier, such as magnesium silicate, silica, carbon, alumina and the like, preferably magnesium silicate, at atmospheric pressure with complete safety in as much as any explosive tendency of the catalyst is obviated by the inert carrier. The carrier may be prepared from magnesium silicate having a bulk density of about 0.2 to 1.0 gram/centimeter$^3$ in powder form over which there is impregnated a solution of a copper salt, optionally a bismuth compound may be added, the latter to act as an inhibitor of polymerization of acetylene by copper metal). The mixture is heated to drive off volatiles and to convert the salts to the cupric precursor of the active catalyst. The thus obtained catalyst will pass through a sieve having a 10 to 300 holes per inch mesh.

Repeated tests have shown that the copper impregnated magnesium silicate powdered catalyst of the instant invention cannot be either detonated or burned, unlike most copper containing catalysts of the prior art.

While not wishing to be bound by any particular theory, it is believed that some type of "chemical interaction" has taken place between the copper and the lattice of the magnesium silicate carrier. Repeated water washings have shown that copper will not wash out of the impregnated carrier in contrast to carriers such as pumice and Kieselguhr, from which after impregnation, all of the copper can be removed by washing with water. It is thus believed that the aforesaid "chemical interaction" is responsible for the fact that the activity of the instant catalyst is such that the process may be carried out at economical rates at low acetylene pressures with the advantages that the acetylene cannot be spontaneously decomposed nor the catalyst detonated in contrast to those of the prior art. This interaction is also believed to be responsible for the long life of the catalyst.

DETAILED DESCRIPTION

Ordinarily, the instant catalyst will contain about 5 to about 20, and preferably about 10 to about 15% copper, based on the total weight thereof. There may also be present up to 3% bismuth, preferably 2 to 2.8%. Copper may be determined by degrading the catalyst, with e.g., concentrated HCl and analyzing the resulting solution by standard quantitative analysis techniques. Ordinarily, the ungenerated catalyst will contain about 5 to 15% copper, based on the total weight thereof. During use, the percentage of copper tends to rise, as the magnesium silicate carrier partly dissolves, exposing fresh catalyst surfaces. The catalyst of the instant invention is preferably generated by means of the introduction of the acetylene into the formaldehyde-catalyst reaction medium.

As stated, when generating the catalyst, the cupric precursor in situ is subjected to the simultaneous action of the reactants at the required pressure in a substantially aqueous medium at the temperature of about 60° to 120°C. At temperatures substantially outside this range, or in strongly basic or acidic media, or acetylene partial pressures greater than 2 atmospheres, or in the substantial absence of either formaldehyde or acetylene, poor catalyst tends to result. Preferably the catalyst generation temperature is in range of 60° to 120°C. The pH of the aqueous medium is in the range of 3 to 10, and preferably 5 to 6. The concentration of formaldehyde in the aqueous medium is ordinarily in the range of 5 to 60, advantageously at least 10 and preferably 30 to 40 weight % at the outset of the reaction.

Ordinarily, the partial pressure of acetylene over the aqueous medium is in the range of 0.1 to 1.9 atmospheres; preferably it is in the range of 0.4 to 1.5.

In carrying out the catalyst generation, nitrogen or another substantially inert gas such as methane or carbon dioxide may be present, as may also the common components of crude acetylene, such as methyl acetylene and ethylene. Oxygen is preferably exlcuded for safety reasons. In small catalyst batches, the supported cupric precursor may be slurried in cold neutral formaldehyde solution and the acetylene introduced as the slurry is heated. Equivalent results are obtained by heating the catalyst slurry with formaldehyde at not too high a temperature, such as 70°C, for a period of several hours before introducing acetylene. For larger batches, it may be preferable to introduce the cupric precursor incrementally to a hot neutral formaldehyde solution under acetylene pressure. The aqueous solution may advantageously be a stream containing propargyl alcohol and/or butynediol, e.g., a recycle stream.

The catalyst generation reaction is preferably continued until the cupric copper is substantially completely converted to cuprous copper form, which with the preferred cupric precursors, generally requires 4 to 48 hours after all the precursor has been contacted under the prescribed conditions. Preferably, also, the prescribed conditions of temperature, pH and acetylene/formaldehyde concentration balance and range will be maintained throughout the catalyst generation. However, departures from the prescribed conditions during the course of the preparation reaction can be tolerated, as the reaction is relatively insensitive to minor changes in operating conditions.

The pH of the aquous medium normally decreases as the reaction proceeds, at a rate and to an extent which tends to increase with the initial acidity of the reaction medium and also with the reaction temperature. Accordingly, the pH may be, and advantageously is, controlled to some extent by beginning at the preferred initial pH of 3 to 10, to some extent by operating in the preferred temperature range of 60° to 120°C. Additional control may be achieved by adding small amounts of acid acceptor such as sodium acetate as the reaction proceeds. Further control may be achieved by carrying out the catalyst generation as a continuous stirred reaction, fresh neutral formaldehyde solution being continuously introduced into an agitated reaction zone, (any acidic effluent may, if desired, be filtered away from the copper-containing particles) as the reaction proceeds, all the while maintaining the acetylene partial pressure.

The ethynylation reaction per se, comprises contacting the reactants at a partial pressure of not more than about 1.9 atmospheres with an aqueous slurry of the catalyst as above described, in a continuous stirred reaction at 80° to 120°C. The formaldehyde and acetylene are preferably continuously fed into the reaction zone where they are introduced into and preferably below the surface of, the aqueous catalyst slurry, and thoroughly mixed into the same by vigorous agitation, and effluent is continuously withdrawn.

The reaction temperature for ethynylation is desirably 60° to 120°C, advantageously 80° to 115°C and preferably 85° to 110°C. Advantageously, the pH of the reaction mixture will be in the 3 to 10 and preferably 4.5 to 7 range, and may be maintained by ion exchange or acid acceptor treatment of the continuous feed or by addition of a suitable buffering agent.

The formaldehyde concentration in the liquid medium in contact with the slurried catalyst in the course of the ethynylation reaction will ordinarily be 0.5 to 60% and advantageously at least 0.5 to 37% under steady state conditions. The acetylene partial pressure will ordinarily be at least 0.5 atmospheres. Advantageously, the acetylene partial pressure will be in the range of 0.4 to 1.9 atmospheres. Preferably, the acetylene partial pressure above the aqueous medium will be 0.5 to 1.5 atmosphere and the catalyst will be present in amounts of about 1 to 20 weight parts per 100 weight parts of aqueous medium. For the purpose of the present invention, in the substantial absence of extraneous gas, the acetylene partial pressure may be taken as the total pressure minus the absolute pressure of water and formaldehyde at the reaction temperature. As in the catalyst generation, crude acetylene may be used, but for safety reasons it should be advantageously substantially free of oxygen.

The effluent from the reaction zone may be heated and/or subjected to reduced pressure to volatilize formaldehyde, propargyl alcohol and a portion of the water which are condensed and combined with supplemental concentrated formaldehyde for recycle to the ethynylation reactor, purging any buildup of methanol at convenient intervals in a continuous operation, and sending the balance of effluent as aqueous alkynol directly to hydrogenation. Alternatively, effluent from the reaction zone may be fed to a conventional plug flow ethynylation to react any excess formaldehyde.

The invention will be more specifically described and explained by means of the following examples, which are not to be considered as limiting but merely illustrative of the invention. All parts and proportions therein as well as in the appended claims are by weight unless otherwise specified.

EXAMPLE I

Preparation of the instant catalyst and two prior art catalysts.

Three catalysts are prepared by mixing 100 g. of catalyst support with 100 ml. of the following impregnation solution.

| | |
|---|---|
| 702 g. | $Cu(NO_3)_2 \cdot 3 H_2O$ |
| 120 g. | $Bi(NO_3)_3 \cdot 5 H_2O$ |
| 60 g. | Conc. $HNO_3$ |

Dilute with water to 1200 ml. total.

The impregnated catalysts are dried at 120°–140° then roasted for six hours at 480°.

| Catalyst | Support | Yield | Appearance |
|---|---|---|---|
| 1 (Prior art) | Pumice | 123.4 | Grey-brown powder |
| 2 (Prior art) | Kieselguhr | 128.1 | Grey-brown powder |
| 3 | Magnesium Silicate | 109.0 | Grey-green powder |

A sample of the impregnated but undried catalyst using each support is exhaustively washed with water until no further copper is removed. Numbers 1 and 2 lost all of the copper, but 3 remained pale blue and retained (after drying) about 75% of the original copper content.

| Comparison of Kieselguhr base with Magnesium Silicate and Pumice base | | | | | |
|---|---|---|---|---|---|
| | Kieselguhr (K) $C_2H_2$ | | Magnesium Silicate (MS) $C_2H_2$ | | Pumice (P) $C_2H_2$ | |
| Day | % Formaldehyde | Rate,ml.min. | % Formaldehyde | Rate,ml.min | % Formaldehyde | Rate,ml.min. |
| 1 | 37 | 3.3 | 37 | 2.1 | 37 | 2.4 |
| 2 | no change | 6.5 | no change | 2.7 | no change | 4.1 |
| 3 | no change | 6.5 | no change | 3.7 | no change | 4.3 |
| 4 | no change | 6.4 | no change | 4.5 | no change | 4.3 |
| 5 | no change | 6.7 | no change | 5.5 | no change | 4.2 |

-continued
Comparison of Kieselguhr base with Magnesium Silicate and Pumice base

| | Kieselguhr (K) C$_2$H$_2$ | | Magnesium Silicate (MS) C$_2$H$_2$ | | Pumice (P) C$_2$H$_2$ | |
|---|---|---|---|---|---|---|
| Day | % Formaldehyde | Rate,ml.min. | % Formaldehyde | Rate,ml.min | % Formaldehyde | Rate,ml.min. |
| 6 | 10 | 9.6 | 10 | 7.7 | 10 | 6.4 |
| 7 | 10 | 9.1 | 10 | 7.9 | 10 | 6.1 |
| 8 | 10 | 9.0 | 10 | 8.1 | 10 | 6.0 |
| 9 | 10 | 8.8 | 10 | 8.0 | 10 | 5.7 |
| 10 | 10 | 8.3 | 10 | 8.1 | | |
| 11 | 10 | 8.7 | 10 | 8.4 | | |
| 12 | 10 | 9.0 | 10 | 9.2 | | |
| 13 | 10 | 8.9 | 10 | 9.6 | | |
| 14 | 10 | 8.7 | 10 | 9.8 | | |
| 15 | 10 | 9.1 | 10 | 9.5 | | |
| 16 | 10 | 8.8 | 10 | 9.8 | | |
| 17 | 10 | 8.9 | 10 | 9.7 | | |
| 18 | 10 | 8.5 | 10 | 9.7 | | |
| 19 | 20 | 9.7 | 20 | 10.2 | | |
| 20 | 4 | 6.1 | 4 | 7.0 | | |
| 21 | 4 | 6.2 | 4 | 7.1 | | |
| 22 | 10 | 8.4 | 10 | 9.8 | | |

The above are carried out with 10 grams of catalyst at 80°C, at atmospheric pressure.

RESULTS FOR (K), (MS) and (P)

Filter, wash and vacuum dry catalyst. Recovered weight, 9.5 g. reddish-brown powder of (K).

Filter, wash and vacuum dry catalyst. Recovered weights 9.3 g. (P) and 6.1 g (MS) of reddish brown powders.

| | ANALYSIS OF RECOVERED CATALYST | | | | | |
|---|---|---|---|---|---|---|
| Sample | %.Cu$^{1+}$ | % Cu$^0$ | % Cu$^{2+}$ | % C | % H | % Residue |
| (K) | 6.4 | 3.8 | 2.4 | 7.5 | 0.8 | 89.4 |
| (MS) | 12.1 | 4.1 | 3.2 | 12.2 | 1.4 | 75.6 |

The total grams of copper are almost exactly the same in the two samples (1.17 g (K) and 1.18 g (MS) but the latter had lost more carrier (by leaching) and had somewhat more carbon and hydrogen. In addition, the proportion of copper remaining in the cuprous form is much higher for MS. The loss in weight (MS) is due to magnesium decreasing from about 8% to about 0.8% silica is reduced from about 23% to about 18%. This loss is the process of slowly dissolving away the carrier with the accompanying continual exposure of additional surface of the active catalyst.

EXAMPLE II

Generation of catalyst and effect of conditions thereof.

All runs are carried out at 80° and atmospheric pressure. After generation at the listed conditions, the catalysts are used to ethynylate 10% formaldehyde solutions, changed daily. Except for run 1, the generation solutions are not changed during the generating period.

| Runs | Formal. conc. used for generation, % | Rate with 10% formal. ml. C$_2$H$_2$/g.cat.-min. | Rate Improvement % above standard |
|---|---|---|---|
| 1 | 10** | 0.77 | 8 |
| 2 | 10 | 0.87 | 24 |
| 3 | 19 | 1.04 | 47 |
| 4 | 38 | 1.17 | 65 |

**Fresh 10% formaldehyde was exchanged for the supernatant liquid daily (ca. 7 hours of operation per day).

EXAMPLE III

Generation of Catalyst

Sixty grams of a ctalyst powder containing 13% copper and 2.5% bismuth on a magnesium silicate carrier (prepared by following the procedure of Example I) is charged together with 500 ml. of aqueous 10% formaldehyde solution. The mixture is heated to 80°C and acetylene allowed to enter as required at 80°. After a 7 to 8 hour period, the mixture is cooled and allowed to settle. The liquid is drawn off through a filter and replaced with fresh 10% formaldehyde. After each period the activity increased as the catalyst is further generated.

TABLE A

| | Daily Rate Uptake | Analysis at End of Day* | | |
|---|---|---|---|---|
| Day | ml. C$_2$H$_2$/Min. | % F | % B | % P |
| 1 | 4.5 | 7.1 | 1.8 | 0.25 |
| 2 | 10.7 | 6.5 | 3.9 | 0.28 |
| 3 | 16.0 | 6.0 | 4.5 | 0.31 |
| 4 | 19.2 | 4.4 | 5.4 | 0.28 |
| 5 | 21.9 | 4.4 | 5.9 | 0.35 |
| 6 | 24.5 | 4.2 | 6.6 | 0.43 |
| 7 | 24.6 | 4.0 | 6.9 | 0.42 |

*F=Formaldehyde, B=Butynediol, P=Progargyl Alcohol

EXAMPLE IV

Half of the generated catalyst from Ex.III is charged together with 450 grams of 25% formaldehyde solution into the same reactor and ethynylated at 80°C and atmospheric pressure.

TABLE B

| Hours on Stream | Rate for Interval ml.Acet./Min. | Analysis | | |
|---|---|---|---|---|
| | | % F | % B | % P |
| 8 | 22.0 | 19.2 | 8.4 | 0.20 |
| 15 | 21.5 | 13.5 | 15.3 | 0.21 |
| 23 | 18.1 | 9.4 | 19.2 | 0.35 |
| 30 | 13.7 | 5.9 | 25.5 | 0.44 |
| 37 | 9.7 | 3.8 | 29.0 | 0.42 |
| 45 | 6.5 | 2.0 | 30.8 | 0.45 |
| 52 | 4.2 | 1.1 | 31.2 | 0.45 |
| 59 | 2.2 | 0.60 | 32.2 | 0.48 |
| 67 | 1.3 | 0.35 | 32.3 | 0.51 |

These examples are carried out in baffled vessels, agitated at high speeds with turbine. Even under these conditions, introducing higher speed agitation or a better baffle increases the rate of reaction. The reactor is flushed with acetylene at the start, and then acetylene is introduced from a measured reservoir as required to maintain atmospheric pressure.

EXAMPLE V

Three runs are carried out in which 10g. of the catalyst described in Ex.III is generated with 10%, 19% and 38% formaldehyde. The generation liquor is not changed until generation is finished. After the generation is complete, the catalysts are evaluated for the ethynylation of 10% formaldehyde.

| % Formaldehyde for Generation | Hours Required for Generation | Rate with 10% Formaldehyde ml. $C_2H_2$/Min-g.cat. |
|---|---|---|
| 10 | 60 | 0.87 |
| 19 | 48 | 1.04 |
| 38 | 32 | 1.17 |

When repeated runs are carried out with 10% formaldehyde, the more active catalysts slowly decline in activity, until after about a week they reach the activity of catalyst generated with 10% formaldehyde. After this point, the catalyst activity changes very little.

EXAMPLE VI

Effect of Acetylene or Formaldehyde Starvation

A catalyst which has been used for a prolonged series of ethynylations of 10% formaldehyde is stirred under nitrogen instead of acetylene at 80°C for 6 hours. Upon purging the reactor with acetylene, a normal rate of ethynylation is obtained. An analysis of an aliquot of this catalyst shows that no cuprous copper has been reduced to metallic copper by this treatment.

Another catalyst which has been used for a prolonged series of runs with 10% formaldehyde is run with 0.2% formaldehyde. Upon restoration of the 10% solution, the catalyst shows no damage, as depicted below.

| Day | % Formaldehyde in Run | Rate, ml $C_2H_2$/ min.-g. cat. |
|---|---|---|
| 1 | 10 | 0.84 |
| 2 | 0.2 | 0.10 |
| 3 | 10 | 0.76 |
| 4 | 10 | 0.88 |

EXAMPLE VII

Heat Stability of Catalyst of Ex.III and Catalyst of U.S. Pat. No. 3,560,576

A catalyst is prepared containing 58–60% copper, (as in U.S. Pat. No. 3,560,576) and carefully dried in a vacuum oven at 50°–55° and high vacuum, and then a small amount is heated in a porcelain spoon. A spectacular flash results. Similar tests run with a dozen different samples of the instant catalyst gave no detonation, nor indeed even any visible sign of ignition.

A sample of generated catalyst of Ex.III, 12–14% copper is heated in an oven (under nitrogen) to 200°. After cooling, the catalyst is used for ethynylation of 10% formaldehyde and gives a rate about 67% of that obtained before the high temperature baking.

EXAMPLE VIII

Preparation and Evaluation of Catalyst of U.S. Pat. No. 3,560,576

Basic cupric carbonate, reagent grade powder, $CuCO_3 \cdot Cu(OH_2 \cdot H_2O$ is generated and used for ethynylation in the same low pressure reactors employed for the rest of the program. Unlike the instant catalyst which generates slowly and requires 30–60 hours for attainment of maximum activity, this catalyst is fully generated in at most a few hours. Because of the carbon dioxide produced, it is necessary to vent the reactor and repurge with acetylene frequently during generation of this catalyst.

Generation with 10% formaldehyde gives a relatively inert catalyst, while generation with 19% formaldehyde gives a catalyst which ethynylated fresh 10% formaldehyde at almost exactly the same rate as did an equal weight of the instant catalyst generated with the same concentration of formaldehyde.

EXAMPLE IX

Three-Stage Continuous Butynediol Reactor

Three 10-gallon stainless steel reactors, each stirred by an efficient gas-dispersing turbine, are connected in series so that the reacting mixture in the first overflows to the second which in turn overflows to the third. The overflow from the third reactor is centrifuged and the catalyst paste, after mixing with fresh formaldehyde feed, is returned to the first reactor. The liquid separated by the centrifuge is discharged through a polishing filter to product storage.

To start up the system each reactor is charged to its full working content with 30 liters of 37% formaldehyde and 4 kilograms of a catalyst powder containing 12% copper and 2% bismuth on a magnesium silicate support. The system is purged with nitrogen followed by acetylene and then heated to 95°C supplying acetylene at 2 psi gauge pressure as it is consumed. At 95° the gauge pressure of acetylene is raised to 14 psi and the run is thereafter held at these conditions.

Initially the rate of acetylene consumption increases, as the generation of the active catalyst proceeds. After about 8 hours, the rate levels and then drops. Fresh 29% formaldehyde is then introduced as feed at a rate of 12 liters per hour with the product being removed after the third reactor and the catalyst recirculated as described. After running for eight hours in this manner, the system stabilizes and the reactors contain the following compositions.

| Reactor | Composition of Contents, % | | |
|---|---|---|---|
| | Formaldehyde | Butynediol | Propargyl Alcohol |
| 1 | 9.3 | 23.9 | 0.7 |
| 2 | 2.9 | 32.0 | 0.9 |
| 3 (Product) | 0.6 | 34.6 | 1.0 |

Having thus described my invention, what I claim as new, and desire to be secured by Letters Patent is as follows:

I claim:

1. A low pressure process for the preparation of butynediol, comprising reacting formaldehyde and acetylene, at a temperature of about 60° to about 120°C and at a pressure of less than about 2 atmospheres partial pressure of acetylene in an aqueous medium, under agitation, in the presence of an ethynylation catalyst consisting essentially of a water-insoluble cuprous acetylide powder containing about 5 to about 20%, by weight, of copper, 0 to about 3%, by weight, of bismuth, and a magnesium silicate carrier therefor.

2. A process according to claim 1 wherein said water-insoluble cuprous acetylide powder contains about 2% to about 3% bismuth.

3. A process as defined in claim 1 wherein said reaction is carried out continuously.

4. A low pressure process for the preparation of butynediol, comprising continuously reacting, with agitation in an aqueous medium, formaldehyde and acetylene at a temperature of about 60° to about 120°C and pressure of about 0.4 to about 1.9 atmospheres partial pressure of acetylene in the presence of an ethynylation catalyst consisting essentially of a water-insoluble cuprous acetylide powder containing, by weight of said catalyst, about 5 to about 20% copper, 0 to about 3% bismuth, and a magnesium silicate carrier therefor, said cuprous acetylide catalyst having been generated, in said aqueous medium in the presence of formaldehyde and acetylene at a pressure of less than about 2 atmospheres partial pressure of acetylene and at a temperature of about 60° to 120°C, from a copper-oxide-containing precursor having, by weight of said precursor, about 5 to about 20% copper, 0 to about 3% bismuth, and a magnesium silicate carrier therefor.

5. A process as defined in claim 4 wherein the formaldehyde concentration in the aqueous medium is about 0.5 to 60 weight %.

6. A process as defined in claim 4 wherein said aqueous medium is at a pH of about 3 to about 10.

7. A process as defined in claim 4 wherein said catalyst is present in amounts of about 1 to about 20 weight parts per 100 weight parts of aqueous medium during said reaction.

8. A process according to claim 4 wherein said copper-oxide-containing precursor contains about 2% to about 3% bismuth.

* * * * *